(12) United States Patent
Vanerhav et al.

(10) Patent No.: US 10,889,203 B2
(45) Date of Patent: Jan. 12, 2021

(54) VEHICLE POWER SUPPLY SYSTEM WITH REDUNDANCY AND METHOD FOR CONTROLLING THE POWER SUPPLY SYSTEM

(71) Applicant: Volvo Car Corporation, Gothenburg (SE)

(72) Inventors: Axel Vanerhav, Lerum (SE); Fabian Fogelberg, Stora Hoga (SE)

(73) Assignee: Volvo Car Corporation, Gothenburg (SE)

( * ) Notice: Subject to any disclaimer, the term of this patent is extended or adjusted under 35 U.S.C. 154(b) by 40 days.

(21) Appl. No.: 16/351,643

(22) Filed: Mar. 13, 2019

(65) Prior Publication Data

US 2019/0291601 A1 Sep. 26, 2019

(30) Foreign Application Priority Data

Mar. 26, 2018 (EP) .................................. 18163842

(51) Int. Cl.
*B60L 58/21* (2019.01)
*B60L 1/00* (2006.01)
(Continued)

(52) U.S. Cl.
CPC ................. *B60L 58/21* (2019.02); *B60L 1/00* (2013.01); *B60L 3/0046* (2013.01);
(Continued)

(58) Field of Classification Search
CPC ........ B60L 58/21; B60L 58/20; B60L 3/0046; B60L 1/00; B60L 2240/527;
(Continued)

(56) References Cited

U.S. PATENT DOCUMENTS 5,739,596 A * 4/1998 Takizawa ................ G06F 1/263
  307/64
6,268,711 B1 * 7/2001 Bearfield .............. H02J 7/0024
  320/116

(Continued)

FOREIGN PATENT DOCUMENTS

DE  102015104293 A1  9/2016
KR  20160080835 A    7/2016
WO  2017114802 A1    7/2017

OTHER PUBLICATIONS

Jul. 16, 2018 European Search Report issue on International Application No. EP18163842.

*Primary Examiner* — Thomas J. Hiltunen
(74) *Attorney, Agent, or Firm* — Clements Bernard Walker; Christopher L. Bernard

(57) ABSTRACT

A power supply system for a vehicle, the system including: a battery pack including at least two parallel strings of battery cells, each string forming a battery having a first output voltage; a switch mechanism configured to connect one of the at least two batteries to a first battery pack output terminal, wherein the first battery pack output terminal is connected to a first power consumer; and a multichannel DC/DC converter having an input terminal connected to the first battery pack output terminal, the multichannel DC/DC converter including a plurality of outputs, wherein at least one of the plurality of outputs is configured to provide a second voltage, the second voltage being lower than the first voltage, and wherein the at least one output of the multichannel DC/DC converter is connected to a second power consumer.

13 Claims, 3 Drawing Sheets

(51) Int. Cl.
*H02J 7/00* (2006.01)
*B60L 3/00* (2019.01)
*B60L 58/20* (2019.01)
*H02J 7/14* (2006.01)
*H02M 1/32* (2007.01)
*H02M 1/00* (2006.01)
*H02J 1/08* (2006.01)

(52) U.S. Cl.
CPC ............ *H02J 7/0024* (2013.01); *B60L 58/20* (2019.02); *B60L 2210/10* (2013.01); *B60L 2240/527* (2013.01); *H02J 1/082* (2020.01); *H02J 7/1423* (2013.01); *H02M 2001/008* (2013.01); *H02M 2001/325* (2013.01)

(58) Field of Classification Search
CPC ... B60L 2210/10; H02J 7/0024; H02J 7/1423; H02J 1/082; H02J 2310/46; H02M 2001/325; H02M 2001/008
See application file for complete search history.

(56) References Cited

U.S. PATENT DOCUMENTS

| | | | | |
|---|---|---|---|---|
| 6,430,692 | B1* | 8/2002 | Kimble | G06F 1/263 |
| | | | | 307/66 |
| 7,516,726 | B2* | 4/2009 | Esaka | H02J 7/0024 |
| | | | | 123/179.3 |
| 9,461,487 | B2* | 10/2016 | Negru | G06F 1/26 |
| 9,553,509 | B2* | 1/2017 | Hiei | H01L 23/5383 |
| 9,643,509 | B2 | 5/2017 | Bang | |
| 10,384,628 | B2* | 8/2019 | Mohrmann | B60R 16/033 |
| 2010/0213897 | A1* | 8/2010 | Tse | H02J 7/0013 |
| | | | | 320/116 |
| 2012/0056478 | A1 | 3/2012 | Omoto et al. | |
| 2012/0062031 | A1 | 3/2012 | Buthker | |
| 2014/0183939 | A1 | 7/2014 | Jiang et al. | |
| 2015/0054337 | A1 | 2/2015 | Ogale | |
| 2017/0217318 | A1* | 8/2017 | Kowalewski | B60L 58/21 |
| 2017/0282819 | A1 | 10/2017 | Emrani | |
| 2017/0310126 | A1* | 10/2017 | Nguyen | H02J 7/0018 |
| 2018/0323638 | A1* | 11/2018 | Eriksson | B60L 58/18 |
| 2019/0210547 | A1* | 7/2019 | Khafagy | H02J 13/0003 |

\* cited by examiner

VEHICLE POWER SUPPLY SYSTEM WITH REDUNDANCY AND METHOD FOR CONTROLLING THE POWER SUPPLY SYSTEM

CROSS-REFERENCE TO RELATED APPLICATION

The present patent application/patent claims the benefit of priority of co-pending European Patent Application No. 18163842.0, filed on Mar. 26, 2018, and entitled "VEHICLE POWER SUPPLY WITH REDUNDANCY AND METHOD FOR CONTROLLING THE POWER SUPPLY SYSTEM," the contents of which are incorporated in full by reference herein.

TECHNICAL FIELD

The present invention relates to a vehicle power supply system with redundancy and to a method for controlling the power supply system. In particular, the invention relates to a power supply system including redundancy functionality to ensure reliable power supply operation.

BACKGROUND

In modern vehicles it is increasingly important to reduce emissions from the combustion engine to comply with environmental regulations. Since reduced fuel consumption directly leads to reduced emissions, it is desirable to find previously unexplored paths for further reducing the fuel consumption of vehicles.

One way of reducing fuel consumption is to convert functionality of the vehicle which has previously been powered by the combustion engine to instead be electrically powered, i.e. functionalities which migrate from the mechanical to the electrical domain.

Moreover, there is an increasing number of functions of the vehicle requiring electrical power, putting higher demands on the power supply system. Many vehicles may for example be operated as hybrid vehicles where power for propulsion is in part provided by a vehicle battery and an electrical motor. There is also an increasing number of critical safety systems and/or driver assistance systems which demand a reliable power supply.

For many applications, the 12V power supply system existing in a vehicle is no longer sufficient for providing the required power and for providing the reliability required by various vehicle system.

One approach for increasing the reliability and capacity of existing 12V systems would be to provide an additional battery in the vehicle, either to work as a backup for the main battery, or to operate in parallel with a second battery. However, an additional 12V battery would add significant and undesirable weight, cost and complexity to the vehicle.

At least for the above reasons, there is a need for an improved power supply system for a vehicle.

SUMMARY

In view of above-mentioned and other drawbacks of the prior art, it is an object of the present invention to provide an improved power supply system for a vehicle.

According to a first aspect of the invention, there is provided a power supply system for a vehicle. The system includes: a battery pack including at least two parallel strings of battery cells, each string forming a battery having a first output voltage; a switch mechanism configured to connect one of the at least two batteries to a first battery pack output terminal, wherein the first battery pack output terminal is connected to a first power consumer; and a multichannel DC/DC converter having an input terminal connected to the first battery pack output terminal, the multichannel DC/DC converter including a plurality of outputs, wherein at least one of the plurality of outputs is configured to provide a second voltage, the second voltage being lower than the first voltage, and wherein the at least one output of the multichannel DC/DC converter is connected to a second power consumer.

The present invention is based on the realization that a power supply system having redundant functionality can be achieved by providing one battery having redundant strings of battery cells, and where the power supply system further includes a multichannel DC/DC converter. The power supply system is thereby capable of supplying voltage to all vehicle loads regardless of voltage requirement. Moreover, should one battery string malfunction, the switch mechanism can be controlled to connect another battery string to the output terminal of the battery pack to provide power to the loads, thereby providing redundancy without the need for an additional battery.

Accordingly, the described system creates redundancy in the power supply chain, which is increasingly important as critical loads migrate from the mechanical to electrical domain. The redundancy is achieved by utilizing parallelism in the battery pack and by the DC/DC converter design. By a somewhat increased complexity of the battery and the DC/DC converter, redundancy can be achieved at a significantly reduced cost compared to having to duplicate the components of the power supply system.

According to one embodiment of the invention, the switch mechanism may include one switch for each battery in order to individually connect a respective battery to the first battery pack output terminal. Thereby, one or more of the batteries can be connected to the battery pack output terminal. By connection a plurality of batteries in parallel to the battery pack output, the capacity of the battery pack is increased and the load is balanced between several batteries.

According to one embodiment of the invention, the multichannel DC/DC converter is configured to provide a first power level on a first output and a second power level, different from the first power level, on a second output of the multichannel DC/DC converter. The outputs of the DC/DC converter can thus be divided into separate groups to provide additional redundancy with respect to the power provided. Moreover, operating several outputs in parallel with different power output, high efficiency in the DC/DC conversion can be reached at different output power levels. For example, for low power use cases, a separate dedicated output is needed to achieve high efficiency.

According to one embodiment of the invention, the first voltage is preferably 48V and the second voltage is 12V and/or 5V. The voltage of the vehicle can be assumed to be generated on a 48V level by means of a generator connected to the battery. The battery pack can thereby provide power directly to any 48V system of the vehicle, while the DC/DC converter is required to form the lower voltages such as 12V and 5V required for other vehicle systems. The DC/DC converter thus replaces the alternator compared to in a conventional car having only a 12V power supply system.

According to one embodiment of the invention, the battery pack may include a second output terminal configured to connect the battery pack to a second power consumer.

According to one embodiment of the invention the power supply system may further include a first wire harness connecting the first output terminal to a first load and a second wire harness connecting the second output terminal to a second load. Thereby, redundancy can be achieved for the distribution of 48V energy. The use of a first and second wire harness may also be used for clustering of loads, thereby achieving high safety integrity for critical loads such as autonomous drive applications.

According to one embodiment of the invention, the multichannel DC/DC converter may include a first control unit and a second control unit, each control unit being configured to control a voltage output on at least one output of the multichannel DC/DC converter. Accordingly, redundancy can be provided also in the DC/DC converter where each of the first and second control unit may be arranged to independently control each of the outputs of the DC/DC converter.

According to one embodiment of the invention, the first control unit of the DC/DC converter may be configured to control a first subset of outputs of the multichannel DC/DC converter and the second control unit is configured to control a second subset of outputs of the multichannel DC/DC converter, the second subset being different from the first subset. Thereby, each control unit may for example be configured to control a certain subset of outputs having separate power requirements to improve the efficiency of the DC/DC converter.

According to one embodiment of the invention, the switch mechanism may further be configured to connect a first battery string in parallel with a second battery string, and to connect the parallelly coupled battery strings to a battery pack output terminal. This may be achieved by a separate switch arranged internally within the battery pack in order to connect two batteries in parallel if for example the power requirements are increased. It may also be achieved by other types of switch arrangements.

According to one embodiment of the invention, the switch mechanism may further include control circuitry configured to determine if a battery is faulty, and if a battery is determined to be faulty, control the switch mechanism to disconnect a faulty battery from the battery pack output terminal and to connect an operational battery to the battery pack output terminal.

According to one embodiment of the invention, the DC/DC converter includes at least two separate and redundant input/output channels. Thereby, full redundancy of the DC/DC converter can be achieved.

According to a second aspect of the invention, there is provided a method of controlling a power supply system of a vehicle. The power supply system includes a battery pack including at least two parallel strings of battery cells, each string forming a battery having a first output voltage, a switch mechanism connected to the battery pack and configured to connect one of the at least two batteries to a battery pack output terminal, wherein the battery pack output terminal is connected to a first power consumer; and a multichannel DC/DC converter on having an input terminal connected to the battery pack output terminal, the multichannel DC/DC converter including a plurality of outputs. The method includes controlling the multichannel DC/DC converter to provide a second voltage on at least one of the outputs, the second voltage being lower than the first voltage, wherein the at least one output of the multichannel DC/DC converter is connected to a second power consumer.

According to one embodiment of the invention, the method may further include controlling the multichannel DC/DC converter to provide a first power level on a first output and a second power level, different from the first power level, on a second output of the multichannel DC/DC converter. Thereby, the by operating each output of the multichannel DC/DC converter at a power level for which it is optimized, an increased conversion efficiency can be achieved.

According to one embodiment of the invention, the method further includes determining if a battery is faulty, and if a battery is determined to be faulty, controlling the switch mechanism to disconnect a faulty battery from the battery pack output terminal and to connect an operational battery to the battery pack output terminal.

Effects and features of the second aspect of the invention are largely analogous to those described above in connection with the first aspect of the invention.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing an example embodiment of the invention, wherein.

DESCRIPTION OF EMBODIMENTS

In the present detailed description, various embodiments of the system and method according to the present invention will be described with reference to a power supply system for a vehicle.

Figure 1:
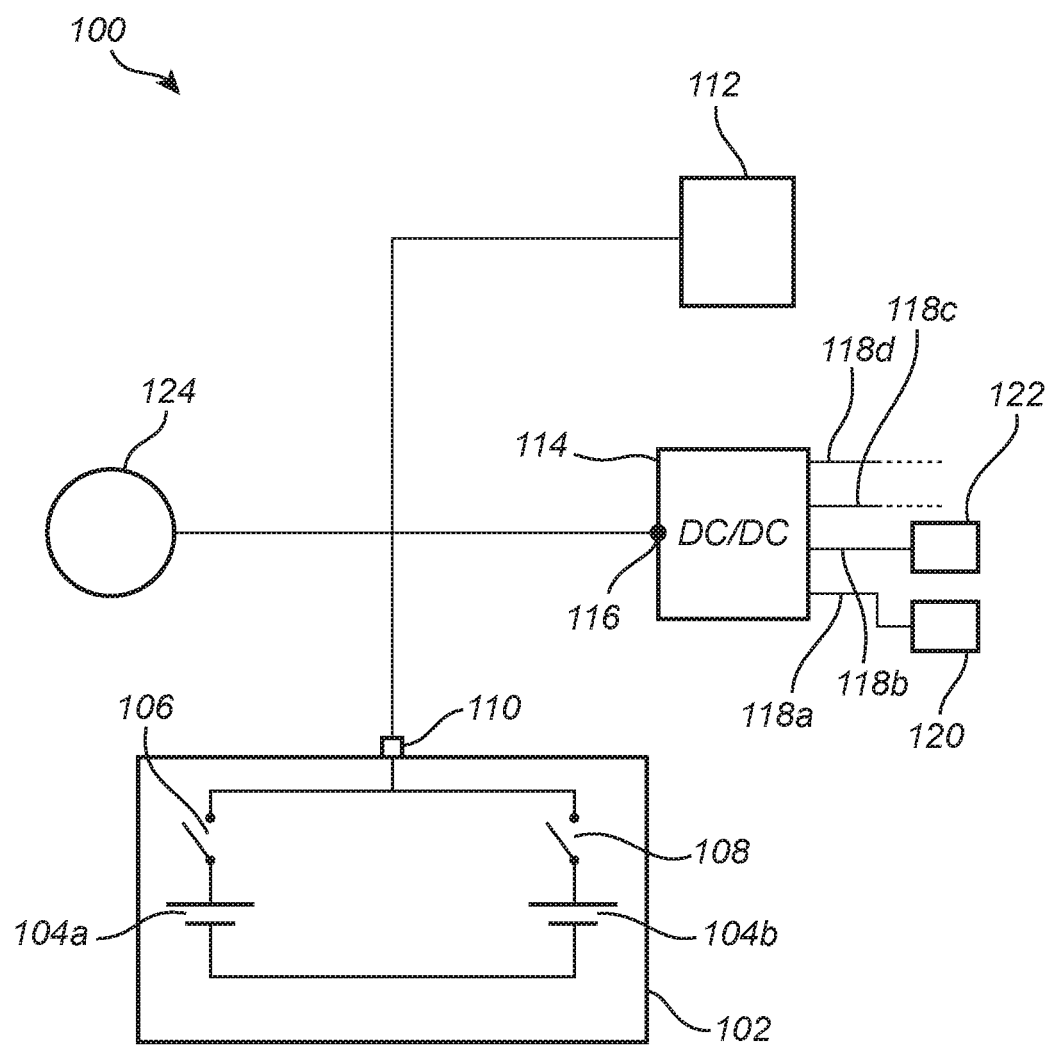
FIG. 1 schematically illustrates a power supply system according to an embodiment of the invention.

FIG. 1 schematically illustrates a power supply system 100 for a vehicle. The system includes a battery pack 102 including at least two parallel strings of battery cells, each string forming a battery 104a-b having a first output voltage. In the present description, a 48V power supply system is described, where the first voltage output by the first and second battery, and consequently by the battery pack, is 48V. The battery pack further includes a switch mechanism 106, 108 configured to connect one of the at least two batteries to a first battery pack output terminal 110. The switch mechanism is preferably integrated in the battery pack 102 and is here illustrated as two separate switches 106, 108 arranged to individually connect a respective battery 104a, 104b to the first battery pack output terminal 110. The switches may preferably be controlled to connect the two batteries 104a-b in parallel to thereby increase the capacity of the battery pack 102 and to achieve balanced battery aging. However, in some application it may be desirable to achieve an even more reliable redundant solution by only connecting one of the batteries 106, 108 at the time to the battery pack output terminal 110, thereby ensuring that the otter battery is available as backup. Moreover, even though the battery pack is here illustrated as including two parallel batteries, 104a-b, it is equally possible to provide additional batteries in parallel within the same battery pack.

The first battery pack output terminal 110 is connected to a first power consumer 112, which is a 48V power consumer connected directly to the battery pack 102, and also to a generator 124 of the vehicle providing 48V power to the battery pack 102. The generator 124 may for example be a belt integrated starter generator (BiSG).

The power supply system 100 further includes a multi-channel DC/DC converter 114 having an input terminal (116) connected to the first battery pack output terminal 110 to receive a 48V voltage. The multichannel DC/DC converter 114 includes a plurality of outputs 118*a-d*, wherein at least one of the plurality of outputs 118*a-d* is configured to provide a second voltage, the second voltage being lower than the first voltage. The second voltage is here 12V so that at least one output of the DC/DC converter 114 provides a replacement for a conventional 12V battery, thereby eliminating the need for a separate 12V battery. The output 118*a* of the multichannel DC/DC converter 114 is further connected to at least one second power consumer 120, 122 which may be one of a number of conventional 12V loads in a vehicle. The multichannel DC/DC converter 114 may also provide other voltages, such as 5V. The power output from each output 118*a-d* of the multichannel DC/DC converter 114 is not fixed, but can be everything between zero and maximum power, where maximum power is the power for which the output is designed. The power consumers 120, 122 may also be referred to as loads to be powered by the DC/DC converter 114. Loads connected to the same output of the DC/DC converter receives the same voltage, while loads connected to different outputs of the DC/DC converter 114 may receive different voltages and/or different power.

A 48V system is often supplied in a vehicle including a hybrid propulsion system where the 48V system is used to power one or more electrical motors of the vehicle for aiding vehicle propulsion. However, also other loads of convenient character may be migrated to 48V from the conventional 12V system, such as wind screen heating, the compressor of an air conditioning system etc. In particular, it may be desirable to move loads with high power requirements to a 48V power supply. The 48V loads are typically connected directly to the battery pack 102, while the 12V loads are connected via the DC/DC converter 114.

The DC/DC converter 114 is also configured to provide the high transient power required for certain safety critical 12V vehicle loads such as steering and braking. An increased peak power capacity of the DC/DC converter 114 allows the 12V vehicle power supply to be removed, and the removal of the heavy lead acid battery typically used as a 12V power supply will significantly reduce weight and cost for the power supply system.

The power supply system further includes control circuitry (not shown) configured to control the switch mechanism 106, 108 and the multichannel DC/DC converter 114. The control circuitry may include one or more of a microprocessor, microcontroller, programmable digital signal processor or another programmable device. The control circuitry may also, or instead, include an application specific integrated circuit, a programmable gate array or programmable array logic, a programmable logic device, or a digital signal processor. Where the control circuitry includes a programmable device such as the microprocessor, microcontroller or programmable digital signal processor mentioned above, the processor may further include computer executable code that controls operation of the programmable device.

Moreover, a second set of control circuitry (not show) may be provided in parallel to provide full redundancy also for the control functionality of the battery pack 102. In a similar way, redundancy in the control logic of the DC/DC converter 114 and the separation of phases in the DC/DC converter 114 into two individual banks can be provided to achieve complete redundancy in the power supply system 100.

Figure 2:
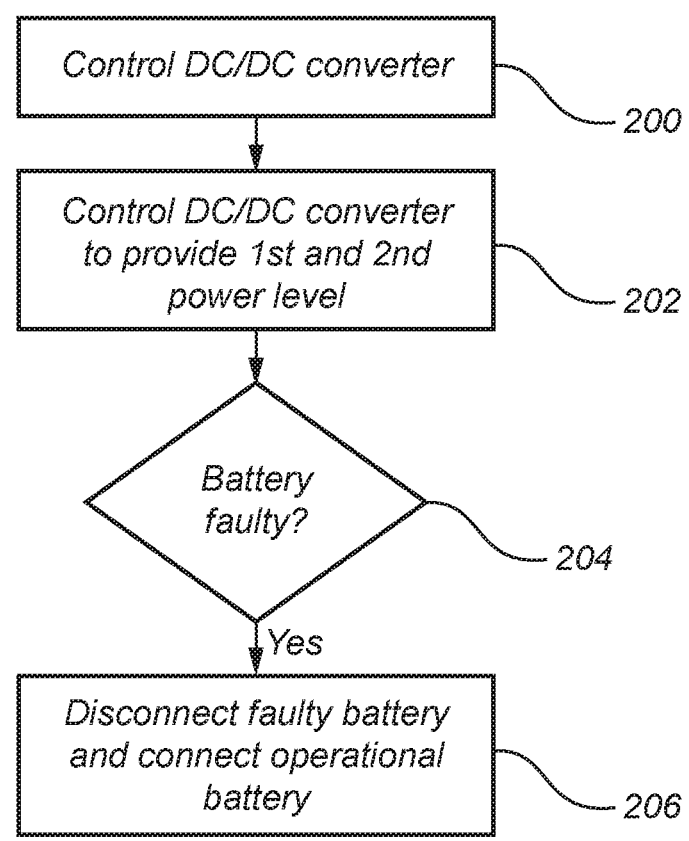
FIG. 2 is a flow chart outlining the general steps of a method according to am embodiment of the invention.

FIG. 2 is a flow chart outlining general steps of a method according to an embodiment of the invention. The method includes controlling 200 the multichannel DC/DC converter 114 to provide a second voltage on at least one of the outputs 228*a*, wherein the second voltage is lower than the first voltage. The method may further include controlling 202 the DC/DC converter 114 to provide a first power level on a first output 118*a* and a second power level, different from the first power level, on a second output 118*b* of the multichannel DC/DC converter 114. The respective power levels may be adapted and controlled based on the requirements of the loads 120, 122 connected to the respective outputs 118*a-b*.

Moreover, the method includes determining 204 if one of the batteries 104*a-b* is faulty, and if a battery 104*a-b* is determined to be faulty, controlling 206 the switch mechanism 106, 108 to disconnect a faulty battery from the battery pack output terminal 110 and to connect an operational battery to the battery pack output terminal 110. It should be noted that the described method steps are not necessarily performed sequentially, one or more of the steps may be performed in parallel as parts of an overall control process of the power supply system 100.

Figure 3:
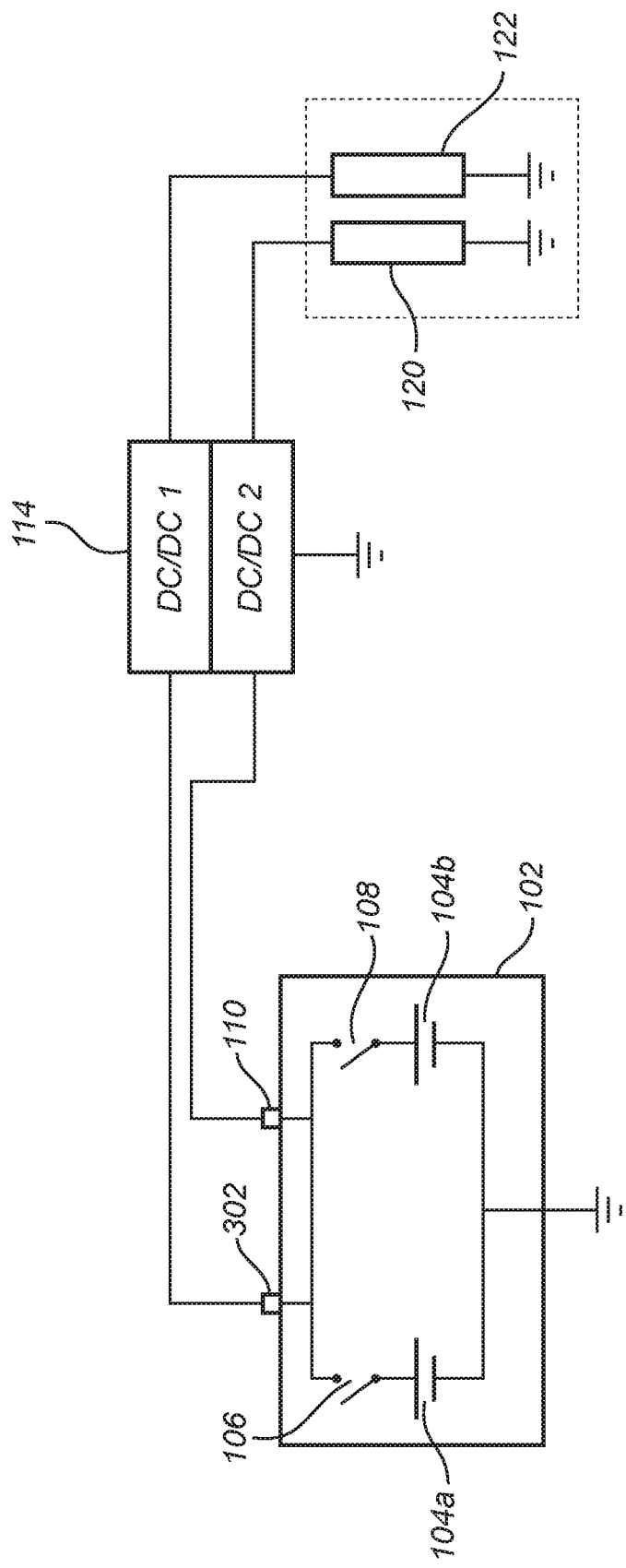
FIG. 3 schematically illustrates a power supply system according to an embodiment of the invention.

FIG. 3 schematically illustrates an embodiment of the invention where the battery pack 102 includes a second output terminal 302. By means of the second output terminal 302, a first and a second wire harness can be connected to the respective first and second output terminal 110, 302. Moreover, DC/DC 1 and DC/DC 2 refers to two separate and redundant channels of the DC/DC converter 114, each channel being capable of independently providing a supply voltage to safety critical loads 120, 122. Thereby, an additional level of redundancy is provided, where also the wire harness distribution system is redundant for functionality that requires very high reliability, such as highly autonomous drive systems. The DC/DC converter 114 can be seen as one of a plurality of loads connected to the battery pack 102. The described system thus ensures delivery of power for all types of single-point faults, e.g. loss of string, loss of cable or loss of DC/DC.

With reference to FIG. 3, the following single point faults can be handled:

For an internal cell fault in one of the batteries 104*a-b*, a switch fault or battery monitoring system control fault, one of the batteries 104*a-b* can be disconnected using the switch mechanism 106, 108. I.e., at least one battery 104*a-b* of the battery pack 102 must still be capable of supplying sufficient power to the safety critical loads.

For a loose nut at the battery pack 102 or at the DC/DC converter 114 or cable fault (e.g. an open or short circuit), the redundant connection between the battery pack 102 and the DC/DC converter 114 ensures that power still can be delivered.

For an internal fault in the DC/DC converter 114, redundant and separate channels ensures that if a failure occurs in the DC/DC converter 114, at least half of the DC/DC converter 114 is still functional.

For loose nuts at the DC/DC converter 114 or for a cable fault (e.g. an open or short circuit), on the output side of the DC/DC converter 114, the redundant connections to safety critical loads 120, 122 ensures power delivery.

For an internal fault in a safety critical load 120, 122 (e.g. an open or short circuit), the safety critical load 120, 122 is redundant by design with two separate connections externally. A redundant steering system will for example use two motors and two control units such that the functionality is ensured even if one of the loads 120 122 is lost.

Even though the invention has been described with reference to specific exemplifying embodiments thereof, many different alterations, modifications and the like will become apparent for those skilled in the art. Also, it should be noted that parts of the power supply system may be omitted, interchanged or arranged in various ways, the power supply system yet being able to perform the functionality of the present invention.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A power supply system for a vehicle, the system comprising:
    a battery pack comprising at least two parallel strings of battery cells, each string forming a battery having a first output voltage;
    a switch mechanism configured to connect one of the at least two batteries to a first battery pack output terminal, wherein the first battery pack output terminal is connected to a first power consumer; and
    a multichannel DC/DC converter having an input terminal connected to the first battery pack output terminal, the multichannel DC/DC converter comprising a plurality of outputs, wherein at least one of the plurality of outputs is configured to provide a second voltage, the second voltage being lower than the first voltage, and wherein the at least one output of the multichannel DC/DC converter is connected to a second power consumer, wherein the multichannel DC/DC converter comprises a first control unit configured to control a first subset of outputs of the multichannel DC/DC converter and a second control unit configured to control a second subset of outputs of the multichannel DC/DC converter, the second subset being different from the first sub set.

2. The power supply system according to claim 1, wherein the switch mechanism comprises one switch for each battery in order to individually connect a respective battery to the first battery pack output terminal.

3. The power supply system according to claim 1, wherein the multichannel DC/DC converter is configured to provide a first power level on a first output and a second power level, different from the first power level, on a second output of the multichannel DC/DC converter.

4. The power supply system according to claim 1, wherein the first voltage is 48V and wherein the second voltage is 12V and/or 5V.

5. The power supply system according to claim 1, wherein the battery pack comprises a second output terminal configured to connect the battery pack to a second power consumer.

6. The power supply system according to claim 5, further comprising a first wire harness connecting the first output terminal to a first load and a second wire harness connecting the second output terminal to a second load at the first voltage.

7. The power supply system according to claim 1, wherein the switch mechanism is further configured to connect a first battery string in parallel with a second battery string, and to connect the parallelly coupled battery strings to a battery pack output terminal.

8. The power supply system according to claim 1, wherein the switch mechanism further comprises control circuitry configured to determine if a battery is faulty, and if a battery is determined to be faulty, control the switch mechanism to disconnect a faulty battery from the battery pack output terminal and to connect an operational battery to the battery pack output terminal.

9. The power supply system according to claim 1, wherein the DC/DC converter comprises at least two separate and redundant input/output channels.

10. A vehicle comprising a power supply system according to claim 1.

11. A method of controlling a power supply system of a vehicle, the power supply system comprising a battery pack comprising at least two parallel strings of battery cells, each string forming a battery having a first output voltage, a switch mechanism connected to the battery pack and configured to connect one of the at least two batteries to a battery pack output terminal, wherein the battery pack output terminal is connected to a first power consumer; and a multichannel DC/DC converter having an input terminal connected to the battery pack output terminal, the multichannel DC/DC converter comprising a plurality of outputs, wherein the multichannel DC/DC converter comprises a first control unit configured to control a first subset of outputs of the multichannel DC/DC converter and a second control unit configured to control a second subset of outputs of the multichannel DC/DC converter, the second subset being different from the first subset, the method comprising:
    controlling the multichannel DC/DC converter to provide a second voltage on at least one of the outputs, the second voltage being lower than the first voltage, wherein the at least one output of the multichannel DC/DC converter is connected to a second power consumer.

12. The method according to claim 11, further comprising controlling the multichannel DC/DC converter to provide a first power level on a first output and a second power level, different from the first power level, on a second output of the multichannel DC/DC converter.

13. The method according to claim 11, further comprising determining if a battery is faulty, and if a battery is determined to be faulty, controlling the switch mechanism to disconnect a faulty battery from the battery pack output terminal and to connect an operational battery to the battery pack output terminal.

* * * * *